United States Patent
McGarvey et al.

(10) Patent No.: US 7,033,493 B2
(45) Date of Patent: Apr. 25, 2006

(54) METHOD AND APPARATUS USING SUPER ABSORBENT POLYMERS FOR DEHYDRATION OF OIL

(75) Inventors: Todd A. McGarvey, Ozark, AL (US); James A. Lilly, Jr., Bethpage, TN (US)

(73) Assignee: Stockhausen, Inc., Greensboro, NC (US)

( * ) Notice: Subject to any disclaimer, the term of this patent is extended or adjusted under 35 U.S.C. 154(b) by 128 days.

(21) Appl. No.: 10/602,264

(22) Filed: Jun. 24, 2003

(65) Prior Publication Data

US 2004/0099606 A1   May 27, 2004

Related U.S. Application Data

(63) Continuation of application No. PCT/US01/49404, filed on Dec. 21, 2001.

(60) Provisional application No. 60/258,270, filed on Dec. 27, 2000.

(51) Int. Cl.
*B01D 24/00* (2006.01)

(52) U.S. Cl. .................. 210/189; 210/264; 210/252

(58) Field of Classification Search ............ 210/150, 210/263, 661, 671, 680, 660, 189, 264, 252
See application file for complete search history.

(56) References Cited

U.S. PATENT DOCUMENTS

| | | | |
|---|---|---|---|
| 3,230,282 A | | 1/1966 | Campagne et al. |
| 4,857,065 A | * | 8/1989 | Seal ........................ 604/368 |
| 5,035,805 A | | 7/1991 | Freeman et al. |
| 5,072,687 A | * | 12/1991 | Mitchell et al. ............... 118/37 |
| 5,112,902 A | | 5/1992 | Moriya et al. |
| 5,252,203 A | | 10/1993 | Lyda |
| 5,409,731 A | | 4/1995 | Nakagawa et al. |
| 6,428,701 B1 | * | 8/2002 | Mullennix et al. ........... 210/606 |

FOREIGN PATENT DOCUMENTS

| | | |
|---|---|---|
| DE | 196 05 433 A1 | 2/1996 |
| EP | 0 072 569 A2 | 2/1983 |
| EP | 0 118 210 A2 | 9/1984 |
| EP | 0 150 747 A2 | 1/1985 |
| EP | 0 167 301 A2 | 1/1986 |
| EP | 0 350 174 A2 | 1/1990 |
| EP | 0 432 787 A1 | 6/1991 |
| GB | 1 563 957 | 4/1980 |
| WO | WO 93/22025 | 11/1993 |
| WO | WO 95/20023 | 7/1995 |
| WO | WO 00/35562 | 6/2000 |

* cited by examiner

*Primary Examiner*—Chester T. Barry
(74) *Attorney, Agent, or Firm*—Smith Moore LLP

(57) ABSTRACT

Water is separated from an emulsion of water and oil by passing the emulsion through a bed of superabsorbent polymer granules which break the emulsion and absorb water from the mixture of water and oil. An apparatus for separating water from an emulsion of water and oil has at least one separation cell containing a bed of super absorbent polymer granules.

6 Claims, 2 Drawing Sheets

METHOD AND APPARATUS USING SUPER ABSORBENT POLYMERS FOR DEHYDRATION OF OIL

This application is a continuation of International Application No. PCT/US01/49404, internationally filed Dec. 21, 2001, which claims priority to the U.S. provisional application No. 60/258,270, filed Dec. 27, 2000.

BACKGROUND OF THE INVENTION

The present invention relates to a method and apparatus for removing water from oil. More particularly, the present invention relates to a method and apparatus using super absorbent polymers to remove water from a water/oil emulsion such as a water/motor oil emulsion.

While the present invention is broadly applicable to a method and apparatus for removing water from a water/oil emulsion, it is particularly well suited for the removal of water from water/oil emulsions where the form of oil is one which is derived from petroleum, used as a lubricant in internal combustion engines, and is commonly referred to as "motor oil." During service as a lubricant in an internal combustion engine, motor oil becomes contaminated with various contaminants, one of which is water. The presence of water in motor oil is generally undesirable and it is usually necessary to remove the water from the motor oil in order to further process or recycle the motor oil. Removal of water from used motor oil is difficult, however, because the mixture is often a stable emulsion which is hard to break.

Water is conveniently removed from motor oil by one of two general methods. One method for removing water from motor oil involves distilling the mixture. This method, however, has two disadvantages. Distillation processing involves heating the emulsion, which requires substantial time and energy, two commodities, which are becoming increasingly expensive. Furthermore, heating of motor oil tends to evaporate volatiles in the oil, which leads to environmental concerns and further expense. Another method for removing water from oil involves chemically treating the oil-water mixture to break the emulsion, allowing the mixture to separate into oil and water phases in a settling tank and then draining the water phase from the tank. However, this method also has certain disadvantages. The chemicals used to break the emulsion are relatively expensive. Also, this method requires substantial time for the separation of the water phase from the oil phase and usually also uses heating to speed up the process. In short, both known methods for removing water from motor oil are relatively expensive and time consuming, and there remains a need for an improved process and apparatus for removing water from oil.

Accordingly, the present invention provides a process and apparatus which employs relatively inexpensive and reusable superabsorbent polymers to break a water/oil or oil/water emulsion and separate the water from the oil by absorbing the water. The present invention substantially reduces the time and cost associated with conventional methods of removing water from oil and does not require heating of the oil which might cause volatiles to separate therefrom.

Further understanding of the present invention will be had from the following disclosure and claims taken in conjunction with the accompanying drawings.

SUMMARY OF THE INVENTION

In accordance with the present invention, a method for separating water from an emulsion of water and oil comprises passing the emulsion through a bed of superabsorbent polymer granules. The bed of superabsorbent polymer granules breaks the emulsion and absorbs water from the mixture of water and oil. Oil is allowed to pass through the bed, thereby separating the water and oil to provide dehydrated oil. An apparatus for carrying out the method includes a column containing a bed of superabsorbent polymer granules and having an inlet and an outlet for passing an emulsion of oil and water through the bed of superabsorbent granules.

DESCRIPTION OF THE INVENTION

Figure 1:
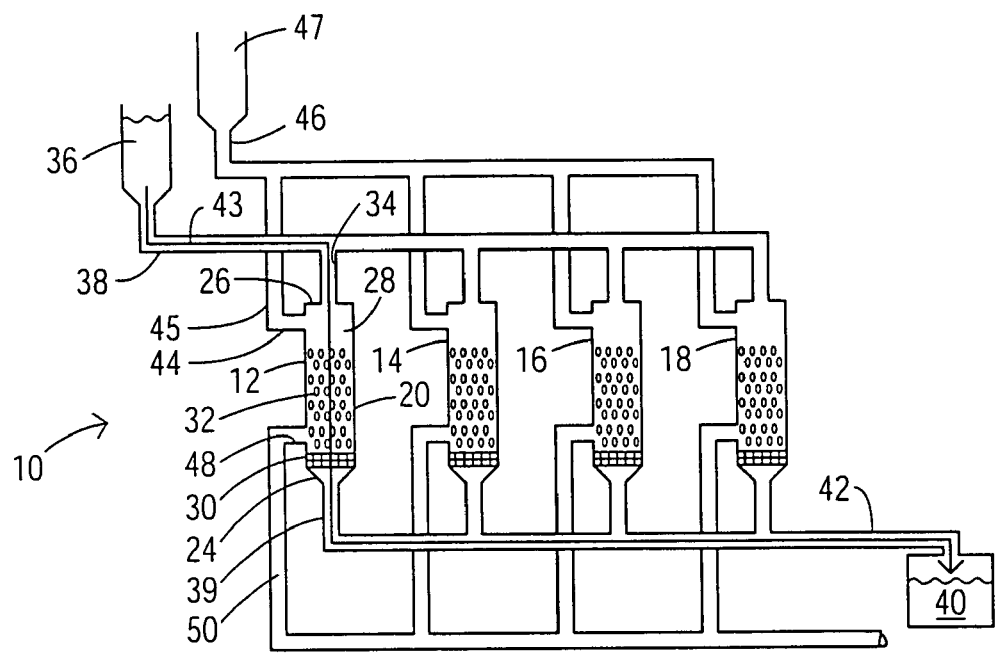
FIG. 1 is a somewhat schematic view illustrating a preferred embodiment of an apparatus for carrying out the method of the present invention using a plurality of separator cells.

The present invention relates to a method and apparatus for removing water from water and oil mixtures using a superabsorbent polymer (hereinafter referred to as SAP). Generally speaking, the method of the present invention comprises the step of bringing a liquid mixture, i.e., emulsion of water and oil into contact with a bed of SAP material. An apparatus of the present invention comprises one or more separation cells containing beds of SAP, preferably in granular form. The water-oil mixture can be a broad range of mixtures of water-in-oil or oil-in-water emulsions.

The term "oil" broadly refers to non aqueous liquids such as fuels and lubricants derived from petroleum or animal or vegetable oils, such as mineral oil, vegetable oil, animal oil, and essential and edible oils. However, it is believed that the present invention is especially advantageous with respect to mineral oil, i.e., petroleum and petroleum-based oil such as engine oil, machine oil or cutting oil. It is contemplated that the present invention will be especially useful in processes for reclaiming or recycling motor oil by removing water from motor oil which has seen service in internal combustion engines or the like. Such oil contains a substantial amount of water as a result of the by products of combustion. Of course, it is to be understood that such oil and water mixtures will also contain other contaminants, some of which may also be removed by the method of the present invention if they are soluble in water as they would be then removed as the water is removed, in contrast to a distillation process.

While the description of the preferred embodiments is set forth in the context of motor oil having water emulsified therein, it will be appreciated by those skilled in the art that the invention is broadly applicable to a broad range of water/oil emulsions and that such other emulsions are intended to be included within the broad scope of this invention. However, it has been found that the present invention is particularly advantageous to remove water from used motor oil. It is especially difficult to separate water from used motor oil because the water-oil mixture tends to be a stable water-in-oil emulsion. Surfactants in the motor oil tend to emulsify any water present in the oil with agitation of the water/oil mixture promoting emulsification. In order to remove water from the mixture by use of a SAP, the water phase must make adequate surface contact with the SAP for a sufficient period of time to obtain absorption of the water by the SAP. Emulsification has the effect of reducing the surface contact between the water and SAP, which increases the time of contact required for absorption. In accordance with the preferred embodiment of the present invention, the water-in-oil emulsion is broken to spread the water phase to present a large surface area over an associated surface area of SAP.

SAPs are polymers, which absorb more than 20 times their weight in aqueous liquids. SAPs are currently in use as water absorbent material in disposable diapers and other personal care products as well as in other uses. SAPs used herein are preferably in the form of granules. SAPs can be made by various known methods. One disclosure of suitable SAPs and their methods of making is set forth in U.S. Pat. No. 5,409,731 Apr. 25, 1995 to Dahmen and Mertens, the disclosure of which is hereby specifically incorporated herein. A preferred SAP is Stockobsorb Agro, which is commercially available from Stockhausen, Inc., Greensboro, N.C.

Generally speaking, a preferred embodiment of an apparatus for carrying out the method of this invention comprises an enclosure such as a vertically oriented column having a bed of SAP granules resting on a screen and an inlet and an outlet for passing a mixture of oil and water into the column through the bed of granules. Agitation of the granules improves the efficiency of the process.

Now referring to the Figures, a preferred embodiment of the present invention is schematically illustrated in FIG. 1 and designated generally by the numeral 10. Water desorption apparatus 10 has a plurality of analogous columns shown as columns 12, 14, 16 and 18 in FIG. 1. Column 12 is generally cylindrical with vertical walls, 20, bottom wall 24 and top wall 26, which, in combination, define an interior 28. Supported on a foraminous base or screen 30 is a bed 32 of SAP granules.

Proximate to the top of column 12 and above bed 32 is an inlet 34 which is in fluid communication with a source of an oil in water mixture 36, hereinafter referred to as waste oil 36. Inlet 34 is shown connected to conduit 38 which functions to transport waste oil from a reservoir 36 thereof to the inlet 34 of column 12. Proximate to the bottom of column 12 and below bed 32 is an outlet 39 through which treated waste oil, now treated oil 40 can be withdrawn from the interior 28 of column 12. Outlet 39 is in fluid communication with conduit 42 which transports treated oil 40 to tank 41. The flow of oil from reservoir 36 to tank 41 is indicated by arrow 43.

Apparatus 10 has provision for replacement or replenishment of bed 32. Thus, proximate to the top of column 12 and above bed 32 is an SAP inlet 44, which is in fluid communication with conduit 45 which is in fluid communication with conduit 46 and reservoir 47 which contains a supply of SAP granules. Proximate to the bottom of column 12 and at the bottom of bed 32 is an SAP outlet 48 which is in fluid communication with conduit 50 which transports used SAP granules to a container or (not shown in the Figure) for used SAP granules.

It will be appreciated by those skilled in the art that columns 14, 16 and 18 are of a construction which is analogous to that of column 12. Thus, and as shown in FIG. 1, inlet 34 of column 12 and the analogous inlets of columns 14, 16 and 18 are connected in parallel fluid communication with conduit 38. Outlet 39 of column 12 and that analogous outlets of columns 14, 16 and 18 are connected in parallel fluid communication with conduit 42. At a downstream point, conduit 42 preferably has a screen to filter out any solids in treated oil 40. SAP inlet 44 and the analogous inlets of columns 14, 16 and 18 are connected in parallel fluid communication with SAP conduit 46 and SAP reservoir 47 while SAP outlet 48 of column 12 and the analogous outlets of columns 14, 16 and 18 are connected in parallel fluid communication with conduit 50.

Figure 2:
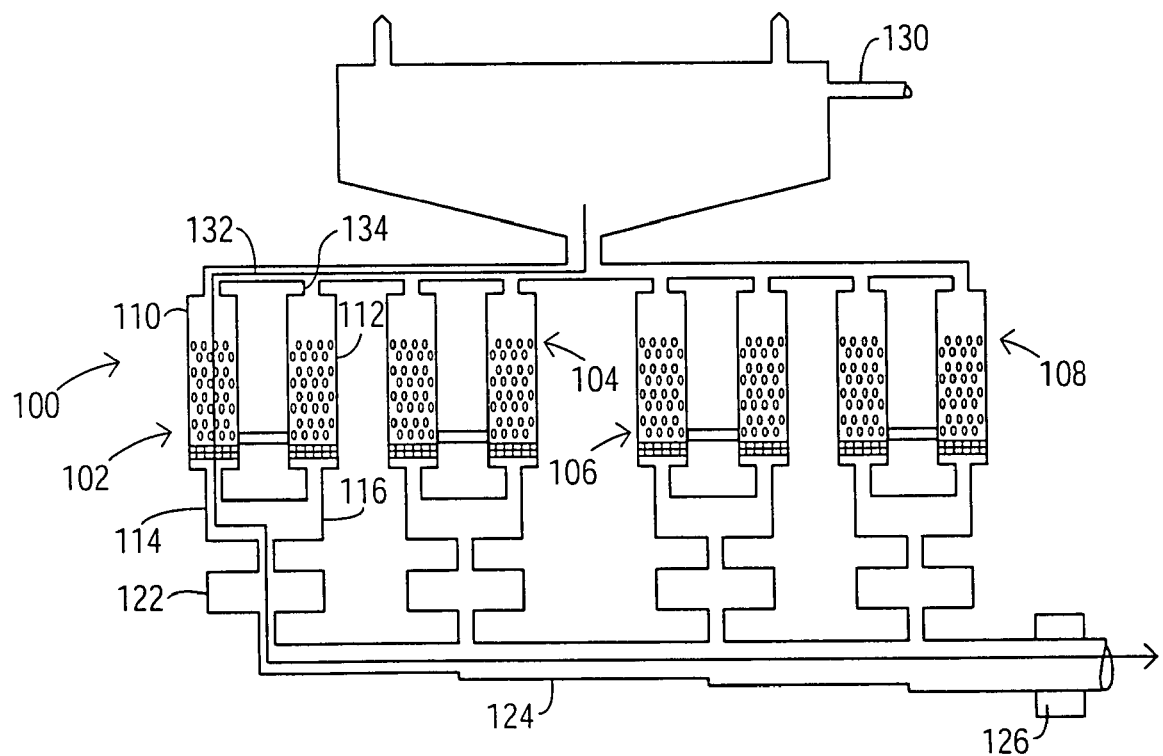
FIG. 2 is a somewhat schematic view illustrating an alternative preferred embodiment of an apparatus for carrying out the method of the present invention using a plurality of pairs of separator cells.

Now referring to FIG. 2, an alternative preferred embodiment of a water desorpotion apparatus of the present invention is illustrated and indicated generally by the numeral 100. Desorption apparatus 100 is similar to water desorption apparatus 10 but is more sophisticated in several respects. Thus, apparatus 100 has pairs of columns indicated by numerals 102, 104, 106 and 108. Column pair 102 has a first column 110 and a second column 112. Columns 110 and 112 are connected functionally in parallel. Each individual column of apparatus 100 is of a construction analogous to columns 12, 14, 16 and 18 of apparatus 10 previously described and will not be further described herein.

Column 110 and column 112 have treated oil output conduits, 114 and 116, which are in fluid communication with a common output conduit 120. Downstream of conduit 120 is a pump 122, which is operatively connected to conduit 120 to draw, treated oil from columns 110 and 112 through conduit 120. The output of pump 122 is in fluid communication with conduit 124. As is best seen from the figure, the analogous outputs of column pairs 104, 106 and 108 are also operatively connected to analogous pumps and in parallel to conduit 124. A further pump 126 is provided downstream the column pairs outputs. The use of pumps downstream from the treatment columns is to avoid their shearing or mixing and, hence, emulsification effect upstream of the columns.

A pressure air source 130 is shown in fluid communication with inlets 132 and 134 of columns 110 and 112. Pressure air source 130 is used to prime the pumps by air before passing waste oil through the columns.

Figure 3:
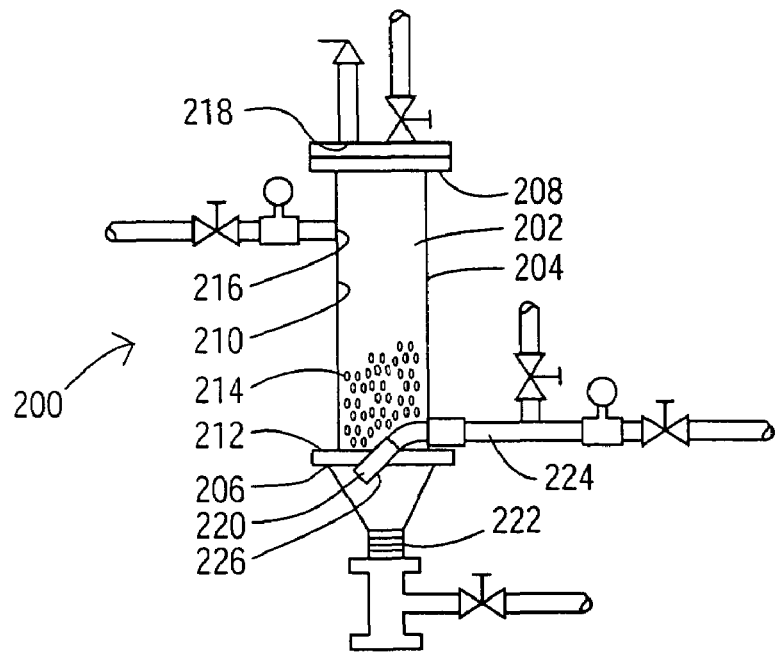
FIG. 3 is a vertical sectional view of a preferred embodiment of a separator cell of the present invention.

A preferred embodiment of a separator cell is shown in FIG. 3 and indicated generally by the numeral 200. Cell 200 has a column 202 with vertical wall 204 and a bottom wall 206 and a top wall 208, which define an interior 210. A foraminous interior wall 212 supports a plurality of SAP granules 214. Cell 200 has an inlet 216 for waste oil, and an inlet 218 for SAP granules, an outlet 220 for removal of oil and an outlet 222 for removal of spent granules. Outlet 220 comprises a pipe 224 with a screen 226 to filter any SAP granules which might pass through foraminous wall 212.

Figure 4:
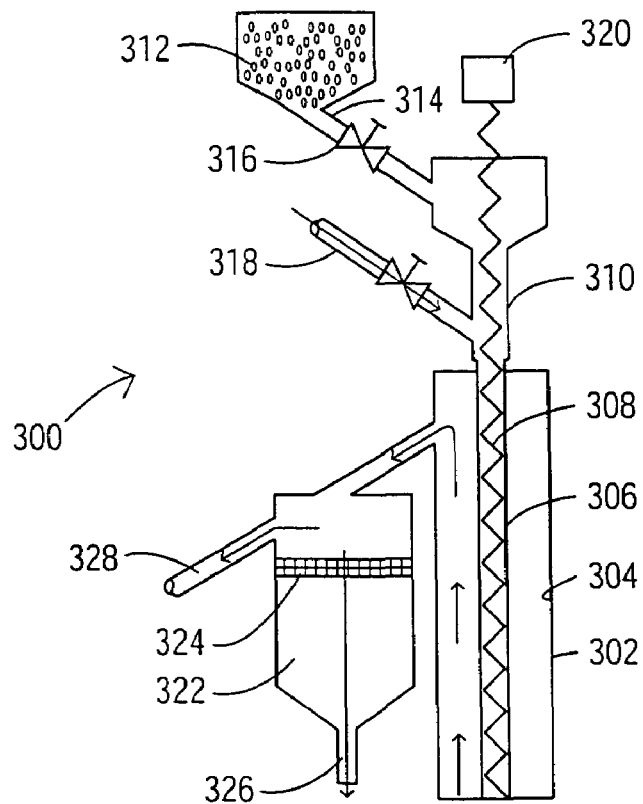
FIG. 4 is a vertical sectional view of an alternative preferred embodiment of a separator cell of the present invention.

Now referring to FIG. 4, another preferred embodiment of a separator cell of the present invention is shown and indicated generally by the numeral 300. Cell 300 generally comprises a tubular column or annulus 302 having an interior 304 and with an inner pipe 306 positioned coaxially therein. Located within pipe 306 is an auger 308 which is rotatably driven by auger drive motor 310. Positioned above annulus 302 and in fluid communication therewith is a manifold 310. SAP hopper 312 is connected to manifold 310 by a conduit 314 through which SAP granules selectively flow from hopper 312 into manifold 310 depending upon the position of valve 316. Manifold 310 also has waste oil inlet 318 for inputting waste oil into manifold 310 and thence into pipe 306. Annulus 302 has an overflow 320 in fluid communication with a screener container 322 which has a screen 324 for catching SAP granules and a first outlet 326 for flow of dehydrated oil and a second outlet 328 for removal of SAP granules.

In operation of cell 300, water oil emulsion and SAP granules are fed into manifold 310 and flow together through inner pipe 306. Auger 308 is driven in rotation in a direction to assist in this flow. The slurry of oil and SAP granules exits inner pipe 306 at the bottom thereof and flows upwardly in annulus 302. The velocity of the oil is such that it maintains a fluidized bed of the SAP granules but does not carry the polymer upward and out of the column. The SAP granules expand as they hydrate eventually filling the column and finally flowing over the overflow and into the screener where they are separated from the dehydrated oil.

The efficiency of the process and apparatus may be improved in some instances by the addition of one or more emulsion destabilizing chemicals to the waste oil. Suitable emulsion destabilizing chemicals are known in the art and are commercially available.

The efficiency of the process and apparatus may also be improved in some instances by heating the waste oil before it is passed through the bed of SAP granules. Preferably, only moderate heating is employed in the present invention, e.g. to about 120 degrees F.

The process and apparatus of this invention may also be used to reduce high levels of chloride ions from reclaimed oil. Such ions tend to be concentrated in the water phase and should be preferentially removed with the water. This contrasts with distillation processes, which do not remove water-soluble components. In one variation of the present invention, oil is first washed with water to solubilize water soluble contaminants in the aqueous phase and then the water is removed in accordance with the method of this invention to thereby remove the water soluble contaminants from the oil. In another variation of the present invention, hydrated SAP, which has been used in the method of the invention, is then used as a fuel source.

It will be appreciated by those skilled in the art that the present invention is suitable for use in a batch or a continuous process. Thus, an apparatus of the invention might have only one column, which is first charged with a bed of SAP granules and then used to remove water from waste oil passed through the bed. After the bed of granules has become hydrated and is no longer suitable to process further waste oil, the process is stopped while the bed is replaced with fresh SAP granules whereupon the process can then be repeated.

However, it is contemplated that for many uses, the present invention will be carried out in a continuous process wherein a plurality of columns are provided in parallel fluid communication with a source of waste oil and to a recipient of treated oil so that the process can continue without interruption.

The following examples are provided to illustrate but not limit this invention. All percentages are by weight unless otherwise indicated.

EXAMPLE 1

A one gallon mixture of 80% oil and 20% water was heated to 120 degrees F. The mixture was then pumped through a vertically oriented ¾ inch pipe which had a poly-nylon screen on a wire support grid positioned transversely in the pipe. Supported by and on the screen was 0.02 lbs of SAP (Stockosorb Agro). Process time was about 5 minutes. The mixture, which had passed through the pipe, was recovered and determined to contain less than 1% water.

EXAMPLE 2

The pipe of Example 1 was used again but with 0.25 lbs of SAP (Stockosorb Agro) on the screen. A one gallon mixture of 60% oil and 40% water was heated to 120 degrees F. and pumped through the pipe. Process time was about 5 minutes. The mixture, which had passed through the pipe, was recovered and determined to contain about 1% water.

What is claimed:

1. An apparatus for separating water from a water/oil emulsion comprising:
   a column containing granules comprised of a bed of super absorbent polymeric material, said column further comprising a water/oil emulsion, and said column having an inlet and an outlet for passing said water/oil emulsion through said bed of super absorbent polymeric material.

2. The apparatus of claim 1 wherein said inlet is located below said outlet so that said water/oil emulsion flowing through said column flows upwardly through said column.

3. The apparatus of claim 2 comprising a plurality of columns connected in parallel between a source of said water/oil emulsion and a retained oil outlet.

4. The apparatus of claim 1 wherein said apparatus includes an auger positioned in the interior of said column.

5. The apparatus of claim 2 wherein said bed of granules is a fluidized bed.

6. The apparatus of claim 1 additionally including a granule removal outlet for removing granules from said column and a granule addition inlet for adding granules to said column.

\* \* \* \* \*